United States Patent
De Mulder

(10) Patent No.: US 11,303,436 B2
(45) Date of Patent: Apr. 12, 2022

(54) CRYPTOGRAPHIC OPERATIONS EMPLOYING NON-LINEAR SHARE ENCODING FOR PROTECTING FROM EXTERNAL MONITORING ATTACKS

(71) Applicant: CRYPTOGRAPHY RESEARCH, INC., Sunnyvale, CA (US)

(72) Inventor: Elke De Mulder, Kirkland, WA (US)

(73) Assignee: CRYPTOGRAPHY RESEARCH, INC., San Jose, CA (US)

( * ) Notice: Subject to any disclaimer, the term of this patent is extended or adjusted under 35 U.S.C. 154(b) by 302 days.

(21) Appl. No.: 16/311,148

(22) PCT Filed: Jun. 23, 2017

(86) PCT No.: PCT/US2017/039107
§ 371 (c)(1),
(2) Date: Dec. 18, 2018

(87) PCT Pub. No.: WO2017/223509
PCT Pub. Date: Dec. 28, 2017

(65) Prior Publication Data
US 2019/0296898 A1 Sep. 26, 2019

Related U.S. Application Data

(60) Provisional application No. 62/410,527, filed on Oct. 20, 2016, provisional application No. 62/354,062, filed on Jun. 23, 2016.

(51) Int. Cl.
*H04L 29/06* (2006.01)
*H04L 9/08* (2006.01)
(Continued)

(52) U.S. Cl.
CPC ............. *H04L 9/085* (2013.01); *G06F 11/30* (2013.01); *H04L 9/0631* (2013.01); *H04L 2209/04* (2013.01); *H04L 2209/24* (2013.01)

(58) Field of Classification Search
None
See application file for complete search history.

(56) References Cited

U.S. PATENT DOCUMENTS 7,397,916 B2   7/2008 Johnson et al.
7,450,720 B2 * 11/2008 Roelse ................. H04L 9/0618
                                                    380/259

(Continued)

FOREIGN PATENT DOCUMENTS

EP   2637349 A2   9/2013

OTHER PUBLICATIONS

Notification Concerning Transmittal of International Preliminary Report on Patentability dated Jan. 3, 2019 re: Int'l Appln. No. PCT/US2017/039107. 6 Pages.

(Continued)

*Primary Examiner* — Maung T Lwin
(74) *Attorney, Agent, or Firm* — Lowenstein Sandler LLP

(57) ABSTRACT

Systems and methods for performing cryptographic data processing operations employing non-linear share encoding for protecting from external monitoring attacks. An example method includes: receiving a plurality of shares representing a secret value employed in a cryptographic operation, such that the plurality of shares includes a first share represented by an un-encoded form and a second share represented by an encoded form; producing a transformed form of the second share; and performing the cryptographic operation using the transformed form of the second share.

20 Claims, 8 Drawing Sheets

(51) Int. Cl.
  *H04L 9/06* (2006.01)
  *G06F 11/30* (2006.01)

(56) References Cited

U.S. PATENT DOCUMENTS

| | | | |
|---|---|---|---|
| 8,515,057 B2 | 8/2013 | Pelletier | |
| 8,615,079 B2* | 12/2013 | Danger | H04L 9/003 380/28 |
| 8,971,526 B2 | 3/2015 | Coron | |
| 9,197,412 B2 | 11/2015 | Guilley et al. | |
| 2002/0101986 A1* | 8/2002 | Roelse | H04L 9/0618 380/42 |
| 2005/0111659 A1* | 5/2005 | Shirai | H04L 9/0625 380/37 |
| 2006/0177052 A1* | 8/2006 | Hubert | H04L 9/003 380/29 |
| 2006/0256963 A1 | 11/2006 | Gebotys | |
| 2006/0265604 A1* | 11/2006 | Dirscherl | H04L 9/0618 713/193 |
| 2006/0291650 A1* | 12/2006 | Ananth | H04L 9/065 380/46 |
| 2008/0253557 A1 | 10/2008 | Dottax et al. | |
| 2009/0103716 A1* | 4/2009 | Shirai | H04L 9/002 380/28 |
| 2012/0093313 A1* | 4/2012 | Michiels | G09C 1/00 380/255 |
| 2012/0179920 A1* | 7/2012 | Farrugia | H04L 9/0631 713/193 |
| 2012/0250854 A1* | 10/2012 | Danger | H04L 9/003 380/28 |
| 2013/0236005 A1* | 9/2013 | Ikeda | H04L 9/003 380/28 |
| 2015/0010146 A1* | 1/2015 | Matsuda | H04L 9/0816 380/44 |
| 2015/0039904 A1* | 2/2015 | Matsuda | H04L 9/0618 713/189 |
| 2015/0278555 A1 | 10/2015 | Melzani | |
| 2016/0013931 A1* | 1/2016 | Pisek | H04L 9/0631 380/28 |
| 2016/0119121 A1* | 4/2016 | Chen | H04L 9/0618 380/44 |
| 2016/0269175 A1* | 9/2016 | Cammarota | H04L 9/002 |
| 2017/0033923 A1* | 2/2017 | Melzani | G06F 7/588 |

OTHER PUBLICATIONS

Notification of Transmittal of the International Search Report and the Written Opinion of the International Searching Authority, or the Declaration dated Sep. 15, 2017 re: Int'l Appln. No. PCT/US17/039107. 15 Pages.
EPO Extended European Search Report dated Jan. 22, 2020 re: EP Appln. No. 17816332.5. 7 Pages.

* cited by examiner

700

710 Receive plurality of shares representing secret value, including unencoded first share and encoded second share 720 Produce transformed (e.g., masked decoded) form of second share 730 Perform cryptographic operation using transformed form of second share

FIG. 7

CRYPTOGRAPHIC OPERATIONS EMPLOYING NON-LINEAR SHARE ENCODING FOR PROTECTING FROM EXTERNAL MONITORING ATTACKS

RELATED APPLICATIONS

This application is the U.S. national stage under 35 U.S.C. § 371 of International Application Number PCT/US2017/039107, filed Jun. 23, 2017, which claims the priority benefit of U.S. Provisional Application No. 62/354,062, filed Jun. 23, 2016 and the priority benefit of U.S. Provisional Application No. 62/410,527, filed Oct. 20, 2016. The entire contents of the above-referenced applications are incorporated by reference herein.

TECHNICAL FIELD

The present disclosure is generally related to computer systems, and is more specifically related to cryptographic data processing systems and methods.

BACKGROUND

Since the advent of computers, constantly evolving have been not only various systems and methods for safeguarding cryptographic keys and/or other sensitive data, but also systems and methods for gaining unauthorized access to the protected data, ranging from conceptually unsophisticated brute force password cracking to complex external monitoring attacks.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 7 depicts a flow diagram of an example method for performing cryptographic data processing operations employing non-linear share encoding for protecting from external monitoring attacks, in accordance with one or more aspects of the present disclosure;

DETAILED DESCRIPTION

Figure 1:
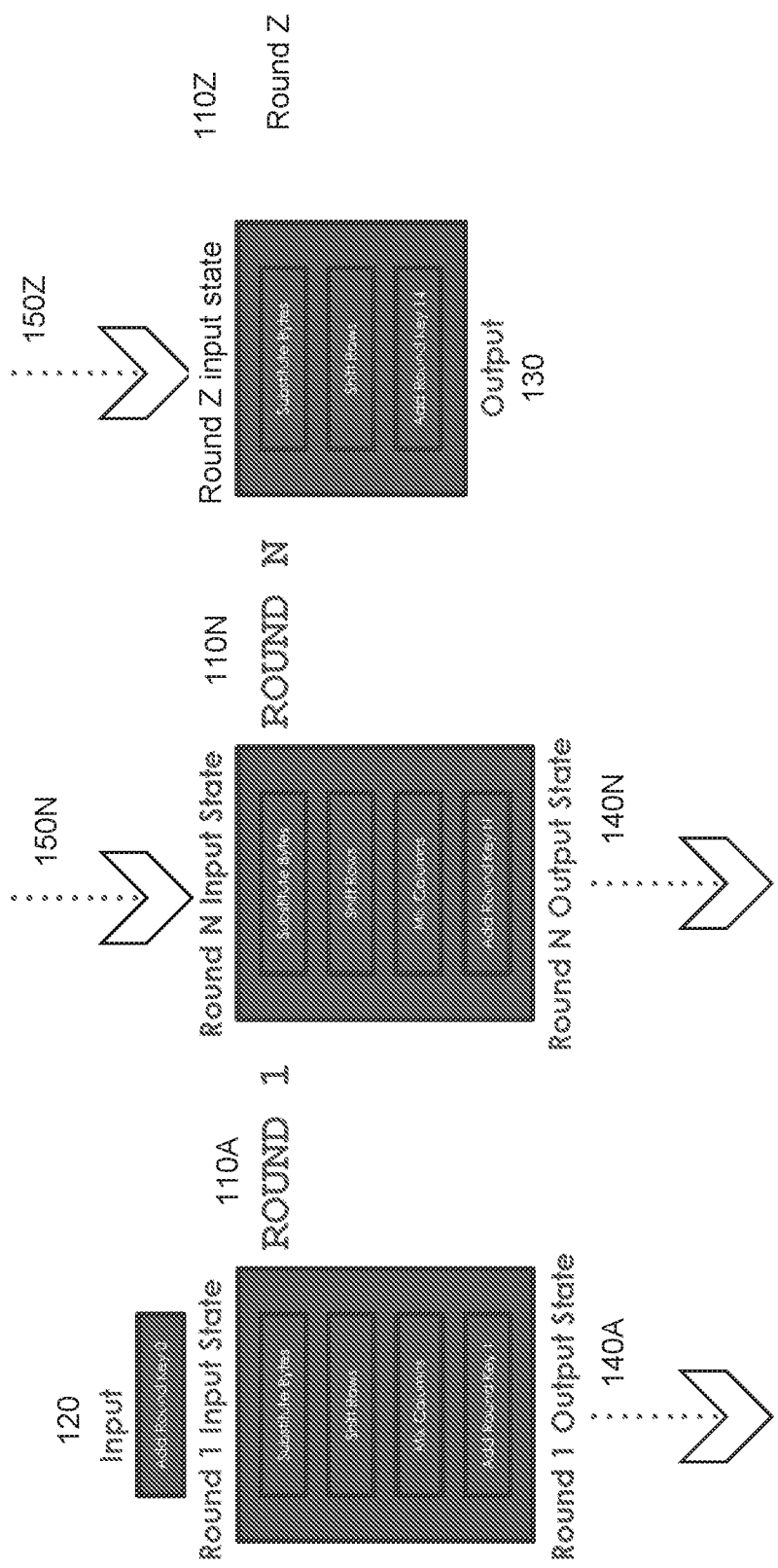
FIG. 1 schematically illustrates a data flow diagram of an example AES implementation by a general purpose or a specialized data processing device, in accordance with one or more aspects of the present disclosure.

Described herein are methods for performing cryptographic data processing operations employing non-linear share encoding for protecting from external monitoring attacks.

"Cryptographic data processing operation" herein shall refer to a data processing operation involving secret parameters (e.g., encryption/decryption operations using secret keys). "Cryptographic data processing device" herein shall refer to a data processing device (e.g., a general purpose or specialized processor, a system-on-chip, or the like) configured or employed for performing cryptographic data processing operations.

"External monitoring attack" herein refers to a method of gaining unauthorized access to protected information by deriving one or more protected information items from certain aspects of the physical implementation of the target cryptographic data processing device. Side channel attacks are external monitoring attacks that are based on measuring values of one or more physical parameters associated with a target cryptographic data processing device, such as the elapsed time of certain data processing operations, the power consumption by certain circuits, the current flowing through certain circuits, heat or electromagnetic radiation emitted by certain circuits of the target cryptographic data processing device, etc.

"Exclusive disjunction" operation (also referred to as exclusive or, XOR, and denoted by $\oplus$ sign) is a logic operation on two operands. The result is true (logical 1), if and only if one of the two operands is true; otherwise, the result is false (logical 0). Therefore, the result of applying the exclusive disjunction operation to two equal operands is always false. This property is relied upon by Boolean masking schemes in cryptographic operations: to mask a secret value S, a mask M is applied to it by the exclusive disjunction operation: $S^* = S \oplus M$; to remove the mask, the exclusive disjunction is performed on the masked secret value and the mask: $S = S^* \oplus M = (S \oplus M) \oplus M = S \oplus (M \oplus M) = S \oplus 0 = S$.

Various side channel attacks may be designed to obtain unauthorized access to certain protected information (e.g., encryption keys that are utilized to transform the input plain text into a cipher text) being stored within and/or processed by a target cryptographic system. In an illustrative example, an attacker may exploit interactions of sequential data manipulation operations which are based on certain internal states of the target data processing device. The attacker may apply differential power analysis (DPA) methods to measure the power consumption by certain circuits of a target cryptographic data processing device responsive to varying one or more data inputs of sequential data manipulation operations, and thus determine one or more protected data items (e.g., encryption keys) which act as operands of the data manipulation operations.

In certain implementations, countermeasures for protecting the secret data (e.g., the round state or the round key) from external monitoring attacks involve employing a masking scheme that receives a secret value and produces two or more shares representing the secret value, so that the encryption/decryption operations are performed on those shares, rather than on the secret value itself. In an illustrative example, such a masking scheme may produce a linear combination (e.g., by employing the exclusive disjunction operation) of shares that represents the original secret value.

However, in a hypothetical scenario employing two shares, $S_1$ and $S_2$, to represent a secret value S by their linear combination $S_1 \oplus S_2$, if the two shares sequentially appear on a communication bus, the power consumption measured by an attacker may be proportional to the bit difference of the two shares, which is the very secret value $S_1 \oplus S_2$ that the scheme seeks to protect from a DPA attack. In order to prevent a DPA attack exploiting this type of vulnerabilities, a software implementation would need to make sure that at no point in time all shares would simultaneously or sequentially appear in a register bank, in a memory, or on a communication bus. However, this may not always be feasible, since certain cryptographic operations require the presence of all shares. Furthermore, due to possible micro-architectural differences of various processors implementing the same instruction set architecture (ISA), software implementations need to be processor-specific, which introduces an additional level of complexity.

The present disclosure overcomes the above-noted and other deficiencies of various common implementations by providing methods of performing cryptographic data processing operations in a manner resistant to external monitoring attacks (e.g., DPA attacks). The methods involve non-linear encoding of shares representing secret values, so that at no point in time all linear shares representing a given secret value would simultaneously or sequentially appear in a register bank, in a memory, or on a communication bus, as described in more details herein below. Thus, the systems and methods described herein represent improvements to the functionality of general purpose or specialized computing devices, by enabling performance of cryptographic data processing operations in a manner resistant to external monitoring attacks.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

In various illustrative examples described herein below, cryptographic data processing devices may be configured or employed for implementing encryption and/or decryption methods based on the Advanced Encryption Standard (AES). However, the systems and methods described herein for performing cryptographic data processing operations in a manner resistant to external monitoring attacks may be applicable to various other cryptographic data processing devices and methods.

FIG. 1 schematically illustrates a data flow diagram of an example AES implementation by a general purpose or a specialized data processing device, in accordance with one or more aspects of the present disclosure. Systems and methods described herein may be employed in a wide variety of cryptographic data processing tasks, e.g., for encrypting/decrypting two way communications in voice and/or data communication systems.

As schematically illustrated by FIG. 1, the AES algorithm involves several iterations (also referred to as "rounds") 110A-110Z to transform, using an encryption key of a fixed size (128, 192, or 256 bits) and a plain text 120 of a fixed size (e.g., 128 bits), into an encrypted cipher text 130. Each round comprises a sequence of certain arithmetic, logical, or reordering operations performed on an input state using a round key which is derived from the encryption key. The resulting state 140 of each but the last round is then utilized as the input state 150 of the subsequent round.

An example AES encryption implementation may start by initializing the state with a plain text. The data processing device may then perform the initial AES round 110A by adding, using the exclusive disjunction operation, the first round key to the state in order to determine the updated state 140A.

In an encryption operation, each of subsequent AES rounds 110N comprises four operations to update the state: Substitute Bytes (independently operates on each of the 16 bytes of the state), shift rows (reorders the 16 bytes of the state), Mix Columns (independently operates on each of four 32-bit words of the state), and Add Round Key (adds, using the exclusive disjunction operation, the round key to the state). The last AES round 110Z comprises three of the above described operations, by omitting the Mix Columns operation. In a decryption operation (not shown in FIG. 1), each AES round comprises inverse operations corresponding to the above described operations, which are performed in the reverse order.

Various AES implementations may differ by the cipher key size: 128 bits, 192 bits, or 256 bits. The number of AES rounds is defined by the key size: for the key size of 128 bits, ten AES rounds may be performed; for the key size of 192 bits, twelve AES rounds may be performed; and for the key size of 256 bits, fourteen AES rounds may be performed.

In certain implementations, a data processing device may employ lookup tables for performing certain non-linear data processing operations. In an illustrative example a data processing device may employ a table (also referred to as "S-box") for performing the Substitute Bytes operation. An S-box receives an m-bit input and produces a corresponding n-bit output, where m is not necessarily equal to n. An m×n S-box may be implemented as a lookup table with $2^m$ elements of n bits each. In another illustrative example, a data processing device may employ a table (also referred to as "T-box") for performing the Substitute Bytes, Shift Rows and Mix Columns operations.

Figure 2:
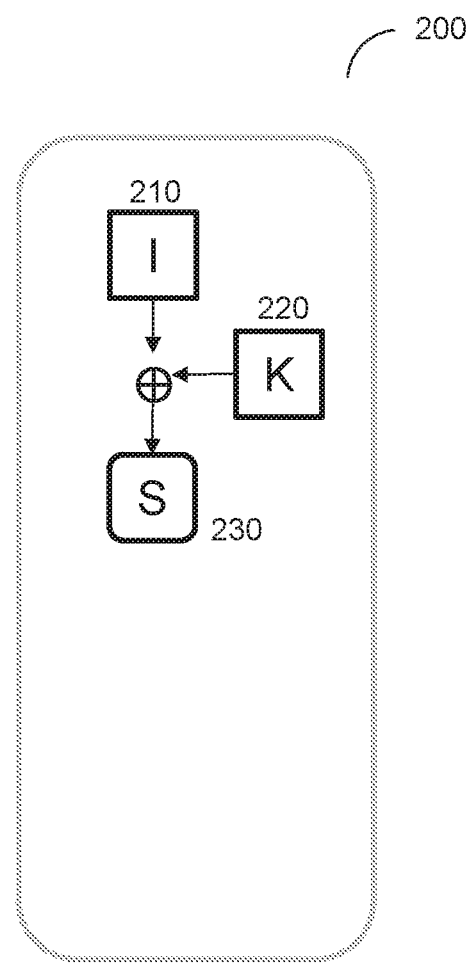
FIG. 2 schematically illustrates an example cryptographic operation that does not involve differential power analysis (DPA) protection measures, in accordance with one or more aspects of the present disclosure.

FIG. 2 schematically illustrates an example cryptographic operation that does not involve DPA protection measures, in accordance with one or more aspects of the present disclosure. In an illustrative example, the example cryptographic operation may be performed in course of implementing an AES encryption or decryption round. As shown in FIG. 2, a cryptographic operation 200 may involve computing a result of the exclusive disjunction operation of an input value 210 and a round key value 220, and feeding the resulting value to an S-box 230.

For protection against DPA attacks, a data processing device may mask the round state by performing the exclusive disjunction operation of the round state with a certain mask. Masking the round state may break the otherwise possible association between the observable power consumption by the data processing device and the cryptographic operation state bits.

Figure 3:
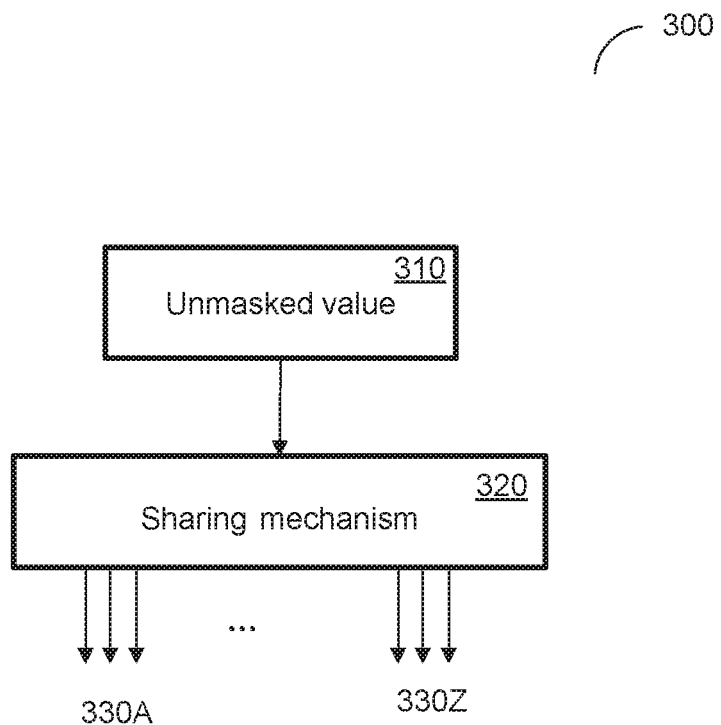
FIG. 3 schematically illustrates an example masking scheme representing a secret value by a linear combination of multiple shares, in accordance with one or more aspects of the present disclosure.

FIG. 3 schematically illustrates an example masking scheme that represents a secret value by a linear combination of multiple shares, in accordance with one or more aspects of the present disclosure. As shown in FIG. 3, a masking scheme 300 may receive an unmasked secret value 310 and employ a sharing mechanism 320 to produce two or more shares 330A-330Z representing an unmasked secret value 310, so that the subsequent encryption/decryption operations would be performed on those shares, rather than on the secret value itself. In an illustrative example, the masking scheme may produce two or more shares $I_i$, a linear combination of which would yield the unmasked value I (310), i.e., $$I = I_1 \oplus \ldots \oplus I_n$$

Figure 4:
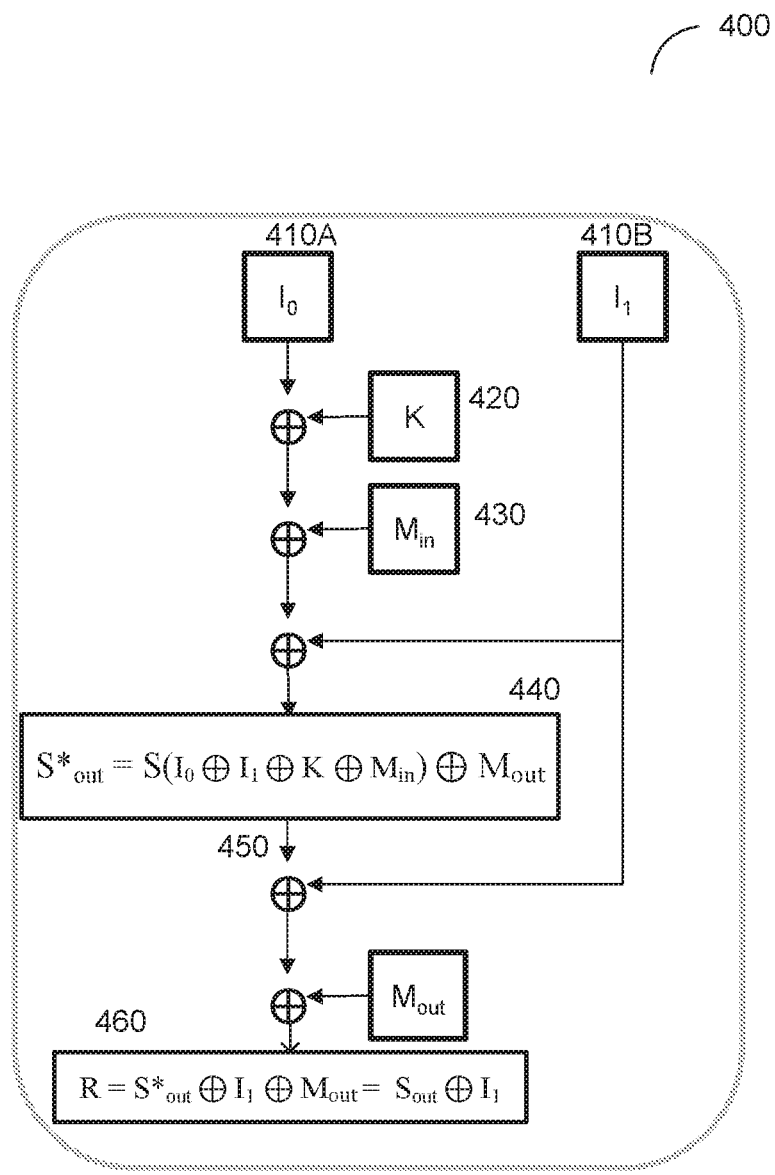
FIG. 4 schematically illustrates an example cryptographic operation that involves the masking scheme of FIG. 3 for protecting against DPA attacks, in accordance with one or more aspects of the present disclosure.

Shares 330A-330Z may then be fed to a cryptographic operation, such as a cryptographic operation 400 of FIG. 4.

FIG. 4 schematically illustrates an example cryptographic operation that involves the masking scheme of FIG. 3 for protecting against DPA attacks, in accordance with one or more aspects of the present disclosure. In an illustrative example, the example cryptographic operation may be performed in course of implementing an AES round. Cryptographic operation 400 and/or each of its individual functions, routines, subroutines, or sub-operations may be performed by one or more general purpose and/or specialized processing devices. As shown in FIG. 4, the cryptographic operation 400 may involve receiving two or more shares $I_0$ (410A) and $I_1$ (410B) representing an unmasked secret value I, such that $$I = I_0 \oplus I_1$$

The cryptographic operation 400 may further involve computing a masked S-box input value $S^*_{in}$ by applying the exclusive disjunction operation to the input shares 410A, 410B, the round key value 420, and the input mask 430, such that $$S^*_{in} = I_0 \oplus I_1 \oplus K \oplus M_{in}$$

The resulting value $S^*_{in}$ may be then fed to the S-box 440, which may be implemented as a lookup table producing a masked output value $S^*_{out}$ (450) corresponding to the masked input value $S^*_{in}$. The returned value $S^*_{out}$ may then be unmasked and linearly combined with the second share value ($I_1$), thus producing the result R (460) of the cryptographic operation 400:

$$R = S^*_{out} \oplus I_1 \oplus M_{out} = S_{out} \oplus I_1$$

As noted herein above, the implementation illustrated by FIGS. 3-4 may be vulnerable to a DPA attack if the two shares $I_0$ and $I_0$ representing the secret value I appear in a memory, register bank, or on a communication bus simultaneously or in a sequential manner. In such a situation, the power consumption measured by an attacker may be proportional to the bit difference of the two shares, which is the very secret value $I = I_0 \oplus I_0$ that the scheme seeks to protect from DPA attacks.

The present disclosure eliminates this vulnerability by performing a non-linear encoding of at least one of the shares representing the secret value. Thus, at no point in time would all shares representing the secret value simultaneously or sequentially appear, in the unencoded form, in a register bank, in a memory, or on a communication bus.

Figure 5:
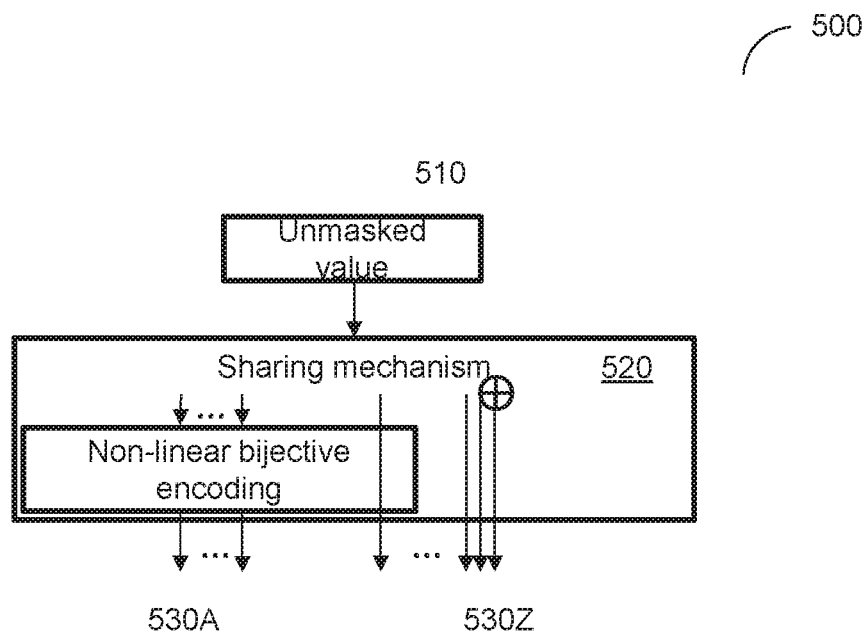
FIG. 5 schematically illustrates an example masking scheme representing a secret value by a linear combination of multiple shares, such that at least one linear share is encoded using a non-linear encoding scheme, in accordance with one or more aspects of the present disclosure.

FIG. 5 schematically illustrates an example masking scheme representing a secret value by a linear combination of multiple shares, such that at least one linear share is encoded using a non-linear encoding scheme, in accordance with one or more aspects of the present disclosure. As shown in FIG. 5, masking scheme 500 may receive an unmasked secret value 510 and employ sharing mechanism 520 to produce two or more shares 530A-530Z representing unmasked secret value 510, so that the subsequent encryption/decryption operations would be performed on those shares, rather than on the secret value itself. In an illustrative example, masking scheme 500 may produce two or more shares $I_i$, a linear combination of which would yield the unmasked value I (510), i.e., $$I = I_1 \oplus \ldots \oplus I_n$$

Masking scheme 500 may then apply a non-linear bijective encoding function $E(I_i)$ to at least one of the shares 530A-530N. "Bijective function" herein shall refer to a relation between a set of inputs (also referred to as the function domain) and a set of permissible outputs, in which each input is related to exactly one output, and each output is related to exactly one input. Those properties make any bijective function reversible, in other words, for any bijective function that transforms the domain A into the set of outputs B, a reverse function always exists that transforms the domain B into the set of outputs A.

In certain implementations, the non-linear bijective encoding function $E(I_i)$ may be implemented by a lookup table, e.g., such as a rotated S-box. For a given input value x, its encoded form $E(x)$ may be produced as $E(x) = S((x + rand) \bmod N)$, where S denotes the lookup table implementing the S-box, rand denotes a randomly chosen integer value, N denotes the number of elements in the table S, and mod denotes a modulo operation.

Figure 6:
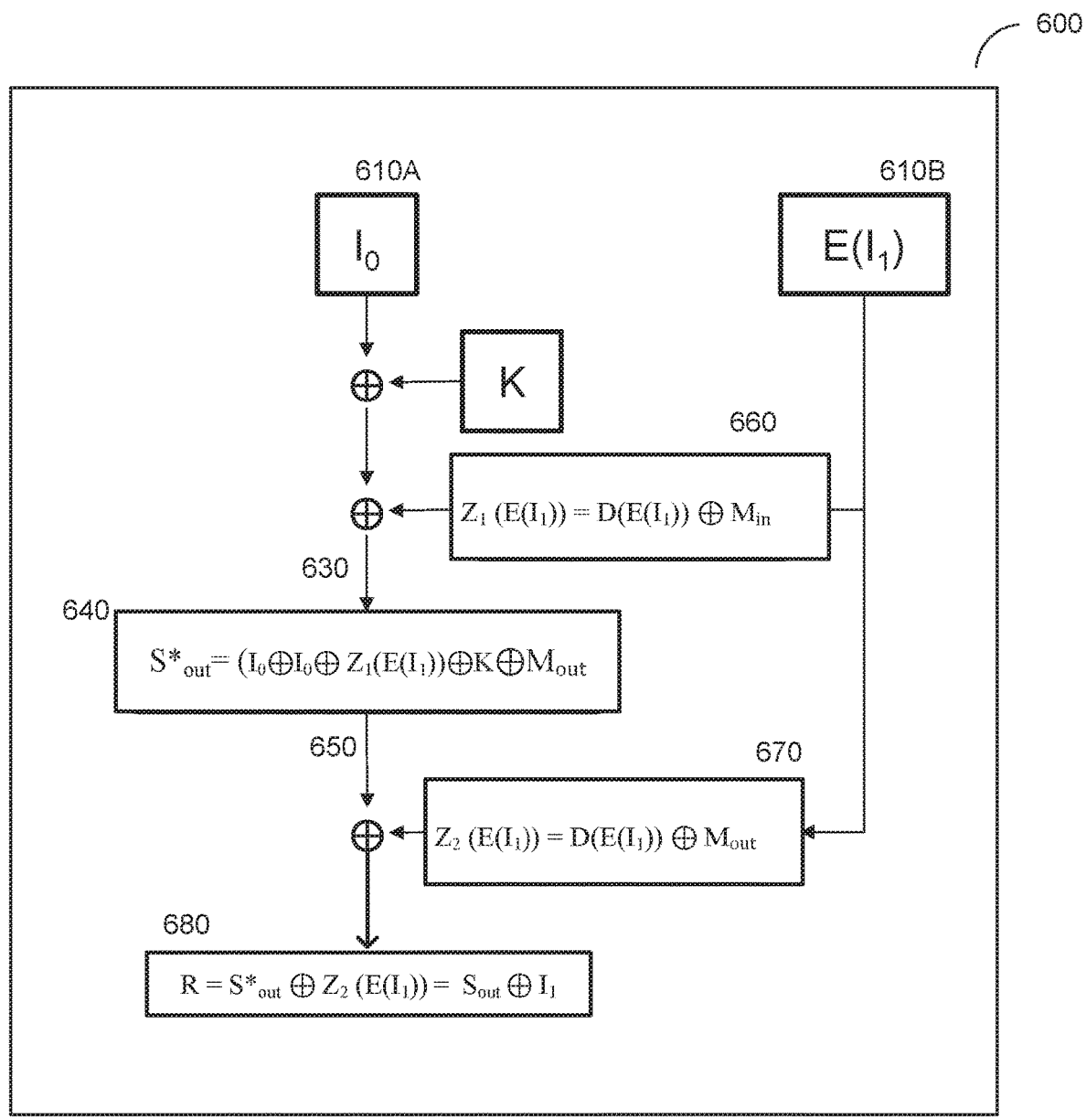
FIG. 6 schematically illustrates an example cryptographic operation that involves a masking scheme with non-linear encoding of at least one share for protecting against DPA attacks, in accordance with one or more aspects of the present disclosure.

Shares 530A-530Z may then be fed to a cryptographic operation, such as example cryptographic operation 600 of FIG. 6. Since at least one share has been encoded by applying the non-linear bijective encoding function, at no point in time all shares 530A-530Z representing unmasked secret value 510 would simultaneously or sequentially appear, in the un-encoded form, in a register bank, in a memory, or on a communication bus.

FIG. 6 schematically illustrates an example cryptographic operation that involves the masking scheme of FIG. 5 with non-linear encoding of at least one share for protecting against DPA attacks, in accordance with one or more aspects of the present disclosure. In an illustrative example, the example cryptographic operation may be performed in course of implementing an AES round. The cryptographic operation 600 and/or each of its individual functions, routines, subroutines, or sub-operations may be performed by one or more general purpose and/or specialized processing devices. As shown in FIG. 6, the cryptographic operation 600 may involve receiving the first input share $I_0$ (610) in the encoded form and the second input share $E(I_1)$ (610B) in the encoded form. As noted herein above, the second input share may be encoded by applying a non-linear bijective encoding function.

Similarly to the cryptographic operation 400 of FIG. 4, the cryptographic operation 600 may further involve a non-linear transformation that may be performed by an S-box 640, which may be implemented as a lookup table producing a masked output value $S^*_{out}$ (650) corresponding to a masked input value $S^*_{in}$ (630). Notably, while at least one input share ($I_1$) has been received by the cryptographic operation 600 in the encoded form, all shares need to be decoded before being fed to S-box 640. This, however, would defeat the purpose of encoding at least one input share, since all shares would simultaneously or sequentially appear, in the un-encoded form, in a register bank, in a memory, and/or on a communication bus. The present disclosure resolves the apparent conflict by introducing a first decoding operation $Z_1$ (660), which receives the encoded input share $E(I_1)$ and returns a masked form of the original (decoded) share:

$$Z_1 = (E(I_1)) = D(E(I_1)) \oplus M_{in} = I_1 \oplus M_{in},$$

wherein D is a decoding function corresponding to the encoding function E, such that $D(E(I_1))=I_1$.

Since the encoding operation $E(I_1)$ is bijective, and hence, reversible, the corresponding decoding operation $Z_1$ $(E(I_1))$ may be implemented by a lookup table which reverses the encoding operation and applies the input mask $M_{in}$ to the decoded result. The returned value $Z(E(I_1))$ may be then linearly combined with the first input share $(I_0)$ and the round key K to produce a masked S-box input value:

$$S^*_{in}=I_0 \oplus Z_1(E(I_1)) \oplus K=I_0 \oplus I_1 \oplus M_{in} \oplus K$$

The masked S-box input value $S^*_{in}$ may be then fed to the S-box 660, which may be implemented as a lookup table producing a masked output value $S^*_{out}$ (650) corresponding to the masked input value $S^*_{in}$. Similarly to cryptographic operation 400 of FIG. 4, the masked output value $S^*_{out}$ may then be unmasked and combined with the second input share value $(I_1)$. However, as noted herein above, the second input share value $(I_1)$ may not be al lowed to appear in a memory, in the register bank, or on a communication bus in the decoded form.

The present disclosure resolves the apparent conflict by introducing a second decoding operation $Z_2$ (670), which receives the encoded input share $E(I_1)$ and returns a masked form of the original (decoded) share:

$$Z_2(E(I_1))=D(E(I_1)) \oplus M_{out}=I_1 \oplus M_{out}$$

Since the encoding operation $E(I_1)$ is bijective, and hence, reversible, the corresponding decoding operation $Z_2$ $(E(I_1))$ may be implemented by a lookup table which reverses the encoding operation and applies the output mask $M_{out}$ to the decoded result. The returned value $Z(E(I_1))$ may be then linearly combined with the masked S-box output value to produce the result R (680) of the cryptographic operation 600:

$$R=S^*_{out} \oplus Z_2(E(I_1))=S^*_{out} \oplus I_1 \oplus M_{out}=S_{out} \oplus I_1$$

As can be seen by comparing this equation with the equation describing the result of the cryptographic operation 400, both cryptographic operations 400 and 600 produce exactly the same result (S-box output of the combination of two shares, combined with the second share). However, the cryptographic operation 400 operates with all shares presented in an un-encoded form, while the cryptographic operation 600 receives at least the second share $(I_1)$ in the encoded form and ensures that at no point in time would all shares simultaneously or sequentially appear, in the un-encoded form, in a register bank, in a memory, or on a communication bus. Thus, in the illustrative example of FIG. 6, the cryptographic operation 600 protects from DPA attacks the original secret value I represented by a combination of shares $I_1 \oplus I_2$.

In an alternative implementation of the cryptographic operation 600 of FIG. 6, the lookup table implementing the S-box 640 may be modified to accept the second share $(I_1)$ in the encoded form, thus eliminating the need in separately implementing the decoding operation 660.

In an illustrative example, the modified S-box may be represented by a table with $2^{m+1}$ elements such that:

$$\text{S-box}^*(E(I_1)\|E(I_2))=\text{S-box}(D(E(I_1)) \oplus D(E(I_2))) \oplus M_{out},$$

wherein S-box* denotes the modified S-box, and ∥ denotes the concatenation operation.

Alternatively, to avoid introducing a separate unmasking step to remove $M_{out}$, the latter may be replaced with $I_2$, thus modifying the previous formula as follows:

$$\text{S-box}^*(E(I_1)\|E(I_2))=\text{S-box}(D(E(I_1)) \oplus D(E(I_2))) \oplus I_2.$$

FIG. 7 depicts a flow diagram of an example method 700 for performing cryptographic data processing operations employing non-linear share encoding for protecting from external monitoring attacks, in accordance with one or more aspects of the present disclosure. Method 700 and/or each of its individual functions, routines, subroutines, or operations may be performed by one or more general purpose and/or specialized processing devices. Two or more functions, routines, subroutines, or operations of method 700 may be performed in parallel or in an order that may differ from the order described above. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. In an illustrative example, method 700 may be performed by computing system 1000 described herein below with references to FIG. 8.

Referring to FIG. 7, at block 710, a processing device implementing the method may receive a plurality of shares representing a secret value employed in a cryptographic operation. The plurality of shares may comprise a first share represented by an un-encoded form and a second share represented by an encoded form, as described in more details herein above.

At block 720, the processing device may produce a transformed form of the second share. The transformed form of the second share may be represented by a masked decoded form of the second share. As described in more details herein above, the processing device may employ a first decoding operation $Z_1$, which receives the encoded input share $E(I_1)$ and returns a masked form of the original (decoded) share:

$$Z_1(E(I_1))=D(E(I_1)) \oplus M_{in}=I_1 \oplus M_{in}$$

At block 730, the processing device may perform the cryptographic operation using the transformed form of the second share. In an illustrative example, the cryptographic operation may be implemented by an S-box. As described in more details herein above, the value $Z(E(I_1))$ may be linearly combined with the first input share $(I_0)$ and the round key K to produce a masked S-box input value $S^*_{in}=I_0 \oplus Z_1(E(I_1)) \oplus K=I_0 \oplus I_1 \oplus M_{in} \oplus K$. The masked output value $S^*_{out}$ produced by the S-box may be re-masked by combining it with the second input share value $(I_1)$ and the output mask: $R=S^*_{out} \oplus Z_2(E(I_1))=S^*_{out} \oplus I_1 \oplus M_{out}=S_{out} \oplus I_1$, wherein $Z_2$ denoted a second decoding operation $Z_2$ (670). The latter receives the encoded input share $E(I_1)$ and returns a masked form of the original (decoded) share: $Z_2(E(I_1))=D(E(I_1)) \oplus M_{out}=I_1 \oplus M_{out}$. Alternatively, a random value may be used as the new second share. Responsive to completing the operations described with reference to block 730, the method may terminate.

Figure 8:
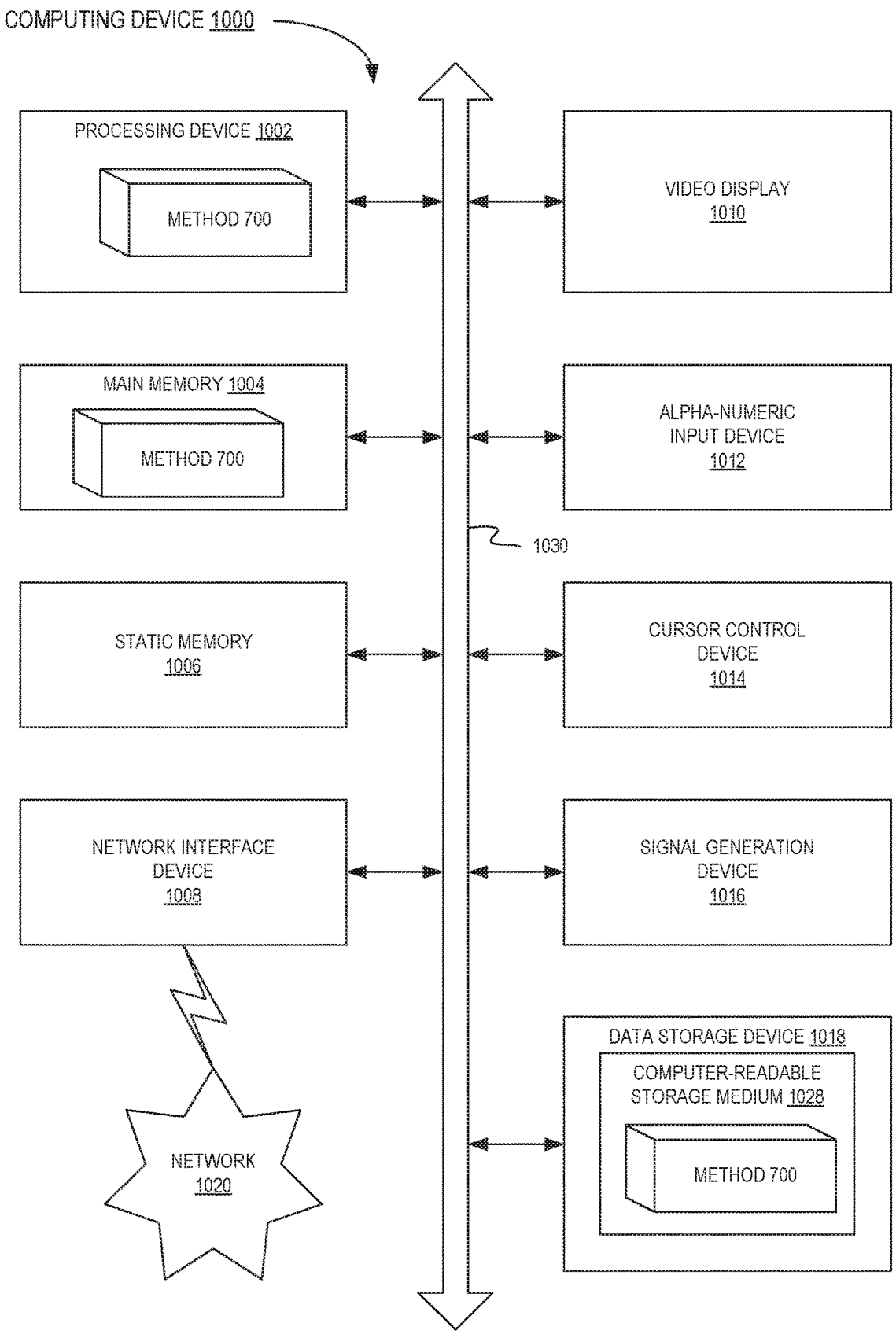
FIG. 8 illustrates a diagrammatic representation of an example computing system within which a set of instructions, for causing the computing device to perform the methods described herein, may be executed.

FIG. 8 illustrates a diagrammatic representation of a computing system 1000 which may incorporate the processing device described herein and within which a set of instructions, for causing the computing device to perform the methods described herein, may be executed. Computing system 1000 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 1000 may include a processing device 1002, which in various illustrative examples may be a general purpose or specialized processor comprising one or more processing cores. The example computing system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be configured to execute methods 700 and/or 1000 for performing cryptographic data processing operations in a manner resistant to external monitoring attacks, in accordance with one or more aspects of the present disclosure for performing the operations and steps described herein.

The example computing system 1000 may further include a network interface device 1008 which may communicate with a network 1020. The example computing system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions (e.g., instructions of method 700 for performing cryptographic data processing operations employing non-linear share encoding for protecting from external monitoring attacks, in accordance with one or more aspects of the present disclosure) implementing any one or more of the methods or functions described herein. Instructions implementing methods 700 and/or 1000 may also reside, completely or at least partially, within the main memory 1004 and/or within the processing device 1002 during execution thereof by the example computing system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   generating, by a processor, a plurality of shares, wherein a linear combination of the plurality of shares represents a secret value to be employed in a cryptographic operation, wherein the plurality of shares comprises an un-encoded form of a first share and an encoded form of a second share, wherein the encoded form of the second share is produced by applying a non-linear encoding function to the second share;
   producing a transformed form of the second share by applying, to the encoded form of the second share, a non-linear decoding function and a masking operation, wherein the non-linear decoding function reverses the non-linear encoding function;
   determining an S-box input value by combining the first share, the transformed form of the second share, and a round key by a linear operation;
   feeding the S-box input value to an S-box; and
   re-masking a masked output value produced by the S-box.

2. The method of claim 1, wherein the cryptographic operation is represented by one of an encryption operation based on Advanced Encryption Standard (AES) or a decryption operation based on AES.

3. The method of claim 1, wherein re-masking the masked output value comprises combining the masked output value, the transformed form of the second share, and an output mask by a linear operation.

4. The method of claim 1, wherein producing the transformed form of the second share prevents the plurality of shares from simultaneously appearing in an un-encoded form in at least one of: a memory, a register bank, or a communication bus.

5. The method of claim 1, wherein producing the transformed form of the second share prevents the plurality of shares from sequentially appearing in an un-encoded form in at least one of: a memory, a register bank, or a communication bus.

6. The method of claim 1, wherein the non-linear encoding function is implemented by a look-up table.

7. The method of claim 1, wherein the non-linear decoding function is implemented by a look-up table.

8. A computer-readable non-transitory storage medium comprising executable instructions that, when executed by a computing device, cause the computing device to:
generate a plurality of shares, wherein a linear combination of the plurality of shares represents a secret value to be employed in a cryptographic operation, wherein the plurality of shares comprises an un-encoded form of a first share and an encoded form of a second share, wherein the encoded form of the second share is produced by applying a non-linear encoding function to the second share;
produce a transformed form of the second share by applying, to the encoded form of the second share, a non-linear decoding function and a masking operation, wherein the non-linear decoding function reverses the non-linear encoding function;
determining an S-box input value by combining the first share, the transformed form of the second share, and a round key by a linear operation;
feeding the S-box input value to an S-box; and
re-masking a masked output value produced by the S-box.

9. The computer-readable non-transitory storage medium of claim 8, wherein the transformed form of the second share is represented by a masked decoded form of the second share.

10. The computer-readable non-transitory storage medium of claim 8, wherein re-masking the masked output value comprises combining the masked output value, a masked form of the second share, and an output mask by a linear operation.

11. The computer-readable non-transitory storage medium of claim 8, wherein the cryptographic operation is represented by one of an encryption operation based on Advanced Encryption Standard (AES) or a decryption operation based on AES.

12. The computer-readable non-transitory storage medium of claim 8, wherein producing the transformed form of the second share prevents the plurality of shares from simultaneously appearing in an un-encoded form in at least one of: a memory, a register bank, or a communication bus.

13. The computer-readable non-transitory storage medium of claim 8, wherein producing the transformed form of the second share prevents the plurality of shares from sequentially appearing in an un-encoded form in at least one of: a memory, a register bank, or a communication bus.

14. A system, comprising:
a memory; and
a processor, coupled to the memory, the processor configured to:
generate a plurality of shares, wherein a linear combination of the plurality of shares represents a secret value to be employed in a cryptographic operation, wherein the plurality of shares comprises an un-encoded form of a first share and an encoded form of a second share, wherein the encoded form of the second share is produced by applying a non-linear encoding function to the second share;
produce a transformed form of the second share by applying, to the encoded form of the second share, a non-linear decoding function and a masking operation, wherein the non-linear decoding function reverses the non-linear encoding function;
determine an S-box input value by combining the first share, the transformed form of the second share, and a round key by a linear operation;
feed the S-box input value to an S-box; and
re-mask a masked output value produced by the S-box.

15. The system of claim 14, wherein re-masking the masked output value comprises combining the masked output value, a masked form of the second share, and an output mask by a linear operation.

16. The system of claim 14, wherein the transformed form of the second share is represented by a masked decoded form of the second share.

17. The system of claim 14, wherein the cryptographic operation is represented by one of an encryption operation based on Advanced Encryption Standard (AES) or a decryption operation based on AES.

18. The system of claim 14, wherein producing the transformed form of the second share prevents the plurality of shares from simultaneously appearing in an un-encoded form in at least one of: a memory, a register bank, or a communication bus.

19. The system of claim 14, wherein producing the transformed form of the second share prevents the plurality of shares from sequentially appearing in an un-encoded form in at least one of: a memory, a register bank, or a communication bus.

20. The system of claim 14, wherein the non-linear encoding function is implemented by a look-up table.

* * * * *